United States Patent
Huh et al.

(10) Patent No.: US 8,416,708 B2
(45) Date of Patent: *Apr. 9, 2013

(54) METHOD AND DEVICE FOR CONTROLLING FLOOR IN PUSH TO SERVICE

(75) Inventors: Kang-Suk Huh, Seoul (KR); Sung-Mu Son, Seoul (KR)

(73) Assignee: LG Electronics Inc., Seoul (KR)

( * ) Notice: Subject to any disclaimer, the term of this patent is extended or adjusted under 35 U.S.C. 154(b) by 563 days.

This patent is subject to a terminal disclaimer.

(21) Appl. No.: 12/791,650

(22) Filed: Jun. 1, 2010

(65) Prior Publication Data

US 2010/0240408 A1    Sep. 23, 2010

Related U.S. Application Data

(63) Continuation of application No. 11/776,333, filed on Jul. 11, 2007, now Pat. No. 7,756, 054.

(60) Provisional application No. 60/852,412, filed on Oct. 18, 2006.

(30) Foreign Application Priority Data

Jun. 25, 2007   (KR) ........................ 10-2007-0062429

(51) Int. Cl.
*H04L 12/28* (2006.01)
*H04L 12/56* (2006.01)
*H04W 4/00* (2009.01)
*G06F 15/16* (2006.01)

(52) U.S. Cl.
USPC ............................ 370/252; 370/328; 709/203

(58) Field of Classification Search .................. 370/252, 370/328; 709/203
See application file for complete search history.

(56) References Cited

U.S. PATENT DOCUMENTS

| 6,912,401 B2 | 6/2005 | Rosen et al. |
| 2002/0150091 A1 | 10/2002 | Lopponen et al. |

(Continued)

FOREIGN PATENT DOCUMENTS

| CN | 1738452 A | 2/2006 |
| EP | 1677551 A2 | 7/2006 |

(Continued)

OTHER PUBLICATIONS

Comneon et al., "Push-to-talk over Cellular (PoC); Architecture; PoC Release 2.0," Technical Specification Architecture, V2.0.8, Jun. 2004, pp. 1-49.

(Continued)

*Primary Examiner* — Ronald Abelson
(74) *Attorney, Agent, or Firm* — Birch, Stewart, Kolasch & Birch, LLP

(57) ABSTRACT

A PT (e.g., Push-To-Talk, Push-To-View or Push-To-Data) service, and more particularly, to a method and device for controlling a floor (talk burst authority, permission to send media burst, etc.) in a PT service, are discussed. According to an embodiment, the method for controlling a state of a Push-To (PT) server, includes starting, by a PT server, a stop talking (T2) timer which is a type of media burst control timer that operates with respect to a terminal having permission to send a media burst; checking, by the PT server on expiry of the T2 timer, whether a media burst release message was already received while the T2 timer was running; and entering, by the PT server, a media burst idle state if the media burst release message was already received as a result of the checking step.

9 Claims, 5 Drawing Sheets

U.S. PATENT DOCUMENTS

| | | | |
|---|---|---|---|
| 2002/0172169 A1 | 11/2002 | Rosen et al. | |
| 2005/0124364 A1 | 6/2005 | Rao et al. | |
| 2006/0025168 A1* | 2/2006 | Lee et al. | 455/518 |
| 2006/0040685 A1 | 2/2006 | Kwon | |

FOREIGN PATENT DOCUMENTS

| | | |
|---|---|---|
| JP | 2004-533170 A | 10/2004 |
| JP | 2006-42356 A | 2/2006 |
| RU | 2003133294 A | 5/2005 |
| TW | 2006/21052 A | 6/2006 |
| WO | WO 2005/062569 A1 | 7/2005 |
| WO | WO-2006/014090 A1 | 2/2006 |
| WO | WO 2006/014090 A1 | 2/2006 |
| WO | WO-2006/032939 A1 | 3/2006 |
| WO | WO 2006/083070 A1 | 8/2006 |

OTHER PUBLICATIONS

Open Mobile Alliance, "OMA PoC Control Plane," Candidate Version 1.0, OMA-TS-PoC-Control Plane-V1_0-20050805-C, Aug. 5, 2005, pp. 1-114.

"PoC User Plane Approved Version 1.0—Jun. 9, 2006," Open Mobile Applicance OMA-TS_PoC-UserPlane-V1_0-20060609-A, pp. 1-165, Jun. 9, 2006.

Ericsson, Motorola, Nokia, Siemens: "Push-to-Talk over cellular (POC) USER Plane; Transport Protocols; POC Release 1.0", Transport Protocol V1.1.0, Aug. 1, 2003, pp. 1-37. XP-00863836.

* cited by examiner

METHOD AND DEVICE FOR CONTROLLING FLOOR IN PUSH TO SERVICE

This application is a Continuation of application Ser. No. 11/776,333, filed on Jul. 11, 2007, now U.S. Pat. No. 7,754,054 which claims the priority benefits of U.S. Provisional Application No. 60/852,412 filed on Oct. 18, 2006 and Korean Patent Application No. 10-2007-0062429 filed on Jun. 25, 2007 in the Republic of Korea, the entire contents of which are hereby incorporated by reference and for which priority is claimed under 35 U.S.C. §120.

BACKGROUND OF THE INVENTION

1. Field of the Invention

This disclosure relates to a Push-To (PT) (e.g., Push-To-Talk, Push-To-View or Push-To-Data) service, and more particularly, to a method and device for controlling a floor (talk burst authority or media burst authority, permission to send media burst, etc.) in a PT service.

2. Discussion of the Related Art

A PT service is a type of half duplex communication service, such as a PTT (Push to Talk) for providing call services by sending voice (audio) data, a PTV (Push to View) for sending image (video) data, and a PTD (Push to Data) for sending various data. Among clients participated in a session established via a server in the PT service, one client having a talk burst authority (or media burst authority or floor) or a permission to send media burst sends media data (e.g., talk burst or media burst) including audio or video and then the remaining clients participated in the session receive the sent media data.

A PT client in the PT service can communicate with a plurality of different PT clients without having to perform a dialing process, a waiting process for call connection and a call connection tone providing process, so that it can support a fast communications service compared with an ordinary mobile communications terminal. Also, the PT service can send a user's voice and data to a single recipient (1-to-1) or to groups of recipients (1-to-many) as in a group chat session.

The related art PT service comprises selecting, by a specific client, one or more other clients and inviting them in a PT session, establishing a session between the inviting client (originating client) and the invited clients (terminating clients), and transmitting/receiving voice (audio) and/or other data between the clients having the session established therebetween.

In the PT service, before a user sends media data such as audio, video or other data via his PT terminal, the user must request a permission to send media data (or talk burst authority or media burst authority or floor, which can be referred to as 'media burst authority' hereafter) from a PT server (e.g., PoC (Push to Talk over Cellular) server). The user can send the media data after being granted the media burst authority from the PT server. As such, controlling the media burst authority of the user's terminal is referred to as Talk Burst Control (or Media Burst Control). In addition, regarding this media burst control, the media burst authority with which a specific user can send media data via a communication channel can be restricted, function of which is called 'Talk Burst Revoke'.

FIG. 1 is a state transition (state machine) diagram of a PT server (from the perspective of the PT server) for a media burst operation to a PT client according to a related art. FIG. 1 illustrates each state of the PT server for media burst (or talk burst) operations to the PT client (i.e., terminal). States illustrated in oval shape in FIG. 1 may be classified into a stable state and a transition state depending on the characteristic of each state. Events are indicated in boxes in FIG. 1.

Relevant states illustrated in FIG. 1 are described as follows.

(a) 'Start-stop' state denotes a state in which no SIP (Session Initiation Protocol) session exists between a PT server and an associated PT client. Hereinafter, this 'Start-stop' state is referred to as '0 (zero) state'.

(b) A state 'U: not permitted and MB_Idle' is a stable state, and denotes a state in which a PT server can receive a talk burst (media burst) authority request from a PT client. In other words, it is a state in which the PT client can send a talk burst (media burst) request (referred to as 'MB_Request) in order to send media burst to the PT server. Hereinafter, the state 'U: not permitted and MB_Idle' is referred to as a 'first state'.

(c) A state 'U: permitted' is a stable state, and denotes a state in which a PT server has granted the permission to send a media burst to an associated PT client so that the associated PT client can send the media burst to the PT server. Hereinafter, this state 'U: permitted' is referred to as a 'second state'. In this state, the PT server operates (starts) a T1 timer (i.e., End of RTP media timer) and a T2 timer (i.e., Stop talking timer). These timers will be explained later.

(d) A state 'U: not permitted but sends media' is a transition state, and denotes a state in which a PT server receives media data (or RTP media packets) from a PT client that does not have a talk burst authority. Hereinafter, this state 'U: not permitted but sends media' is referred to as a 'third state'. In this state, the PT server operates/starts a T8 timer (i.e., media burst revoke timer).

(e) A state 'U: pending MB_Revoke' is a transition state, and a PT server uses this state during a grace period after sending an MBCP (Media Burst Control Protocol) Media Burst Revoke message. Hereinafter, this state 'U: pending MB_Revoke' is referred to as a 'fourth state'. In this state, the PT server operates/starts a T3 timer (i.e., Start talking grace timer), and a period for which the T3 timer is running corresponds to the grace period.

(f) A state 'U: waiting MB_Revoke' is a stable state, and denotes a state in which a PT serve does not grant a permission to send a media burst requested by an associated PT client for a certain period for which a T9 timer is operated/running. When the associated PT client continues sending media data beyond a period of the permission to send the media burst (i.e., a period for which the T2 timer is running until it expires), the PT server panelizes the associated PT client. In this state, the PT server operates/starts the T9 timer (i.e., retry-after timer). Hereinafter, this state 'U: waiting MB_Revoke' is referred to as a 'fifth state'.

(g) A state 'U: not permitted and MB Taken' is a stable state, and denotes a state in which when another PT client (i.e., not associated PT client), other than the associated PT client which has been permitted to send a media burst, requests the permission to send a media burst, a PT server informs the another PT client that the permission to send the media burst is taken. Hereinafter, this state 'U: not permitted and MB_Taken' is referred to as a 'sixth state'.

The timers T1, T2, T3, T8 and T9 introduced in the above description of FIG. 1 are used in order to restrain or control the sending of media burst (MB) between the PT server and the associated PT client(s). Hereinafter, the operations of these timers are described. Generally, media data sent from a PT client to a PT server is sent in a RTP (Real Time Protocol) packet format.

T1 Timer (End of RTP Media Timer)

T1 timer is adapted to count whether a PT server has received a succeeding RTP packet within an available time period after receiving a preceding RTP packet. The T1 timer is generally set to 4 seconds as its default value. After a terminal sends media data, namely, RTP media packets, to a PT server, when the PT server receives a first RTP packet, the T1 timer is started, and it is restarted whenever a following RTP packet is received. When the PT server receives the last RTP packet, the T1 timer is stopped or expires.

T2 Timer (Stop Talking Timer)

T2 timer is adapted to count a permitted (authorized) period for which a terminal having a permission to send a media burst (floor or talk burst authority) can send media data. When the terminal sends a first RTP packet, the PT server starts the T2 timer. The T2 timer is generally defaulted to 30 seconds.

T3 Timer (Stop Talking Grace Timer)

T3 timer is adapted to count a grace period for which the PT server can further receive media data even after the T2 timer expires. Here, the grace period refers to a kind of a marginal excess time for which the PT server is allowed to receive media data even after the T2 timer expires. That is, even if the terminal having the permission to send the media burst has sent the media data after the period for which the terminal is permitted to send the media data, the PT server permits the media data received from the terminal during the set period of the T3 timer, i.e., before the T3 timer expires.

T9 Timer (Retry-After Timer)

T9 timer is adapted to count a penalty time given to a terminal when it sends the media data beyond a permitted period, the penalty time for which the terminal can not be permitted to request the media burst authority to PT server. When the terminal sends the media data beyond (after) a value (time period) set by the T2 timer (i.e., after a permitted period for sending the media data), the PT server sends a MBCP Revoke message or TBCP Revoke message to the terminal and then starts the T3 timer. When the PT server may not receive a MBCP Release message or TBCP Release message from the terminal during the time set by the T3 timer, it starts the T9 timer so that the terminal is not permitted to request the media burst authority and send the media data for a certain period corresponding to the time value set by the T9 timer (i.e., during the running period of the T9 timer).

T8 Timer (Talk Burst Revoke Timer)

T8 timer is started at the time of sending a MB_Revoke message by the PT server. When the terminal has not sent a MB_Release message within a value (i.e., time period) set by the T8 timer, the PT server restarts the T8 timer to wait to receive the MB_Release message being sent by the terminal.

FIG. 2 is a signal flowchart illustrating acquisition of a permission to send a media burst and transmission of media data between a PT server and terminals according to a related art.

Hereinafter, description is provided with reference to FIGS. 1 and 2. Here, it is assumed that a SIP session was initiated in the zero state of the PT server in FIG. 1, and then the PT sever has been transited (changed) into the first state by sending a MB_Idle message to each terminal (PT client device). That is, the PT server is in a state in which each terminal can request a permission (i.e., media burst authority) to send a media burst from the PT server.

Each of terminals A, B and C sends to the PT server a message for requesting a floor (media burst authority or talk burst authority) or a permission to send a media burst (i.e., MB_Request) (S1). If the PT server has decided to grant a permission to send the media burst to the terminal A, the PT server sends a MB_Granted message to the terminal A in response of the MB_Request message thereof. In the meantime, the PT server sends a message indicating the terminal A has taken the permission to send the media burst (i.e., MB_Taken) to the terminals B and C (S2). Through those steps S1 and S2, an operation state of the PT server with respect to the terminal A may be transited from the first state into the second state (i.e., state 'U: permitted') as illustrated in FIG. 1. Accordingly, the terminal A can now send media data (or RTP media packets) to the PT server within the period set by the T2 timer (i.e., during the running period of the T2 timer). Also, through steps S1 and S2, since the terminals B and C have received the MB_Taken message, the operation state of the PT server with respect to the terminals B and C corresponds to the sixth state ('U: not permitted and MB_Taken') as illustrated in FIG. 1.

Because the state of the PT server with respect to the terminal A in FIG. 1 corresponds to the second state (i.e., state 'U: permitted'), the terminal A can send the media data (or RTP media packets) to the PT server (S3). Here, when receiving a first RTP media packet sent by the terminal A, the PT server may start both the T1 timer and the T2 timer simultaneously.

If the terminal A sends a message for releasing the permission to send the media burst (i.e., MB_Release message) within the period for which it is permitted to send the media data (i.e., within a value (time period) set by the T2 timer), the state of the PT server with respect to the terminal A may be transited from the second state into the first state as illustrated in FIG. 1. Also, the PT server may stop the running T2 timer (i.e., the T2 timer is stopped before it expires). However, if the period for which the terminal A is permitted to send the media data (i.e., the value (time period) set by the T2 timer) expires, the PT server sends a message for revoking the permission to send the media burst (i.e., MB_Revoke message) to the terminal A.

Generally, messages and media data (or RTP media packets) from a terminal may be sent via different network routing paths under a physical communication environment. However, such physical communication environment may include a transit delay while receiving the messages and the media data via different network routing paths. In addition, such situation may make the current state of the PT server with respect to the terminal to be the third state (e.g., 'U: not permitted but sends media') unintentionally in the state machine diagram of FIG. 1.

For instance, when the PT server is in the second state and then receives a MB_Release message from the terminal, the PT server transits from the second state to the first state. If the PT server then receives media data (RTP packet) that was sent out by the terminal earlier than the MB_Release message but arrived at the PT server later due to the delay in the routing path, then the PT server transits from the first state to the third state as shown in FIG. 1. But the third state is not desired at this time because the terminal cannot request a permission to send a media burst from the PT server in the third state, and the PT server needs to return to the first state in order for the terminal to be able to request a permission to send a media burst. Further, the PT server may not be able to return to the first state at that time because to do so, the PT server needs to receive another MB_Release message which is unlikely to happen at that time. As a result, the terminal according to the state machine diagram of FIG. 1 of the related art may be kept to remain in the unintended state (e.g., the third state) where it can not request a permission to send a media burst from the PT server, which is a problem.

For example, when RTP media packets and MB_Release message are sequentially sent by the terminal, the MB_Release message may be reached at the PT server earlier than the RTP media packets or vice versa. In that case, the PT server can receive a part of the RTP media packets (e.g., the last or another RTP media packet of the RTP media packets sent by the terminal) via certain network routing paths, after receiving the MB_Release message via other network routing paths. At this time, since the PT server has already received the MB_Release message, the state of the PT server with respect to the terminal in the state diagram of FIG. 1 is transited from the second state (i.e., 'U: permitted') into the first state (i.e., 'U: not permitted and MB_Idle'). Afterwards, even if the PT server has received the last RTP media packet, it can not recognize that the received last RTP media packet has been sent earlier than the already received MB_Release message. Accordingly, the PT server determines that the terminal having no permission to send the media burst has sent the media data (i.e., the received last RTP media packet). Therefore, the PT server discards the received last RTP media packet and then sends a MB_Revoke message (indicating that the permission to send media burst granted to the terminal has been revoked) to the terminal (i.e., this corresponds to 'Situation 1' of FIG. 1). That is, in the state diagram of FIG. 1 according to the related art, the state of the PT server with respect to the terminal is changed from the first state (i.e., 'U: not permitted and MB_Idle') into the third state (i.e., 'U: not permitted but sends media'). Under the third state of FIG. 1, the PT server sends the MB_Revoke message to the terminal and simultaneously operates the T8 timer (i.e., this corresponds to 'Situation 2' of FIG. 1). However, Situation 2 is repeated until the PT server receives a MB_Release message from the terminal, and the state of the PT server with respect to the terminal may keep at the third state in the state machine diagram of FIG. 1. If Situation 2 is repeated, from the perspective of the terminal, the terminal may be unfavorably treated in that it can not request a media burst authority (the permission to send media burst) to the PT server in spite of having sent the MB_Release message previously. This is a problem which may occur due to the different network routing paths of the messages sent by the terminal.

In addition, because of the different network routing paths of the messages sent by the terminal, as a result the terminal may unintentionally reach the fifth state (i.e., U: waiting MB_Revoke) in the state diagram of FIG. 1. That is, after being granted the permission to send the media burst, the terminal (or PT client) may send the media data (i.e., series of RTP media packets) to the PT server during the permitted period for sending the media data (i.e., the time period corresponding to the set value of the T2 timer). In some cases, the series of RTP media packets sent by the terminal have sequence numbers. Also, information on the sequence number of the last RTP media packet may be included in the MB_Release message.

Although the terminal has sequentially sent the series of RTP media packets (i.e., media data) and the MB_Release message to the PT server within the set period on the T2 timer (e.g., 30 seconds), the messages (i.e. the RTP media packets and the MB_Release message) may be non-sequentially received by the PT server, as compared to their sequential sending, because of their different network routing paths. For example, when RTP media packets and MB_Release message are sequentially sent, MB_Release message may be reached at the PT server earlier than the RTP media packets. That is, after receiving the MB_Release message sent by the terminal, the PT server may receive a part of the RTP media packets (e.g., the last RTP media packet of the RTP media packets sent by the terminal). Here, the PT server checks (i.e., retrieves and analyzes) the information on the sequence number of the last RTP media packet included in the MB_Release message, and then waits until the last RTP media packet is received. That is, the state of the PT server with respect to the terminal still stays in the second state (i.e., State 'U: permitted') of FIG. 1. However, if the T2 timer expires while the PT server waits to receive the last RTP media packet, the PT server sends the MB_Revoke message to the terminal (i.e., this corresponds to Situation 3 of FIG. 1). Here, the state of the PT server with respect to the terminal is transited from the second state into the fourth state (i.e., State 'U: pending MB_Revoke'). Afterwards, upon receiving the last RTP media packet, the PT server may consider the last received RTP media packet as an invalid (not-permitted packet) that has not reached within the permitted time period for sending the media data (i.e., the set period of the T2 timer), and thereby penalizes the terminal. Accordingly, the state of the PT server with respect to the terminal is transited from the fourth state into the fifth state (i.e., State 'U: waiting MB_Revoke'), namely, into the state in which the terminal is penalized (punished). That is, the terminal in the fifth state can not request a media burst authority to the PT server for the duration of the penalizing period (i.e., the time period corresponding to the set value of the T9 timer).

Accordingly, in a case where the terminal has sequentially sent RTP media packets (media data) and the MB_Release message within the permitted period for sending the media data (i.e., the time period set on by the T2 timer) (e.g., 30 seconds), if the permitted period for sending the media data elapses under the state that the PT server has first received the MB_Release message but has not received yet a part of the RTP media packets (e.g., the last RTP media packet) due to a transit delay on the network routing paths, the terminal may undesirably be in a state that it can not request media burst authority to the PT server for the time period set on the T9 timer (e.g., 30 seconds), which is not desired.

BRIEF SUMMARY OF THE INVENTION

An object of the present invention is to provide a method and device for controlling a state of a PT server, which address the limitations and disadvantageous associated with the related art.

Another object of the present invention is to provide a PT client device (terminal) and a PT server, which can provide effective media burst control techniques.

Further, this disclosure of the present invention is to allow a terminal (PT client device) to request a permission to send media burst (floor or media burst authority) even if a PT server receives certain media data after receiving a message for releasing the permission to send the media burst from the terminal.

This disclosure of the present invention is also to allow a terminal (PT client device) to request a permission to send a media burst without restricting (restraining or controlling) the request of the terminal for the permission to send the media burst for a certain time period, even if a permitted time period for the permission to send the media burst elapses after a PT server receives a message for releasing the permission to send the media burst from the terminal.

According to an aspect of the present invention, there is provided a method for controlling a state of a Push-To (PT) server, comprising: transiting, by a PT server in a second state, to a first state when a media burst release message is received by the PT server; and remaining, by the PT server, in the first state, if the PT server in the first state receives a media packet from a PT client and if the PT server in the previous second state has received the media burst release message.

According to another aspect of the present invention, there is provided a method for controlling a state of a Push-To (PT)

server, comprising: transiting, by the PT server in the second state, to a first state when the media burst release message is received; determining, by the PT server, if the media burst release message has been received in the previous second state, when a media packet is received while the PT server is in the transited first state; and remaining, by the PT server, in the transited first state when the media packet is received, if the determining step determines that the media burst release message has been received in the previous second state. The method further comprises: receiving, by a PT server in a second state, one or more media packets from a PT client while a T2 timer is running; and receiving, by the PT server in the second state, a media burst release message from the PT client while the T2 timer is running.

According to another aspect of the present invention, there is provided a method for controlling a state of a Push-To (PT) server, comprising: determining, by a PT server in a second state, whether or not a media burst release message has been received, on expiry of the timer T2 (when a T2 timer expires); and transiting, by the PT server, either from the second state to a first state if the determining step determines that the media burst release message has been received, or from the second state to a fourth state, based on the determination result.

According to another aspect of the present invention, there is provided a method of controlling state of a Push-To (PT) server, comprising: receiving, by a PT server, a media burst release message while a T2 timer is running; determining, by the PT server, whether the media burst release message has been received, on expiry of the timer T2 (when the T2 timer expires); and transiting, by the PT server, to a media burst idle state, when the determining step determines that the media burst release message has been received.

According to another aspect of the present invention, there is provided a Push-To (PT) client device comprising: a controller to transmit at least one media packet and a media burst release message to a PT server, to receive a media burst idle message from the PT server in response to the media burst release message, and to transmit a media burst request to the PT server after receiving the media burst idle message, wherein the media burst idle message is received from the PT server if the PT server has received the media burst release message before a timer T2.

According to another aspect of the present invention, there is provided a Push-To (PT) client device comprising: a controller to transmit at least one media packet and a media burst release message to a PT server, to receive a media burst idle message from the PT server in response to the media burst release message, and to transmit a media burst request to the PT server after receiving the media burst idle message, wherein the media burst request is transmitted if the PT server receives at least one media packet in a first state after receiving the media burst release message, the media burst release message received in a previous state by the PT server.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

Figure 1:
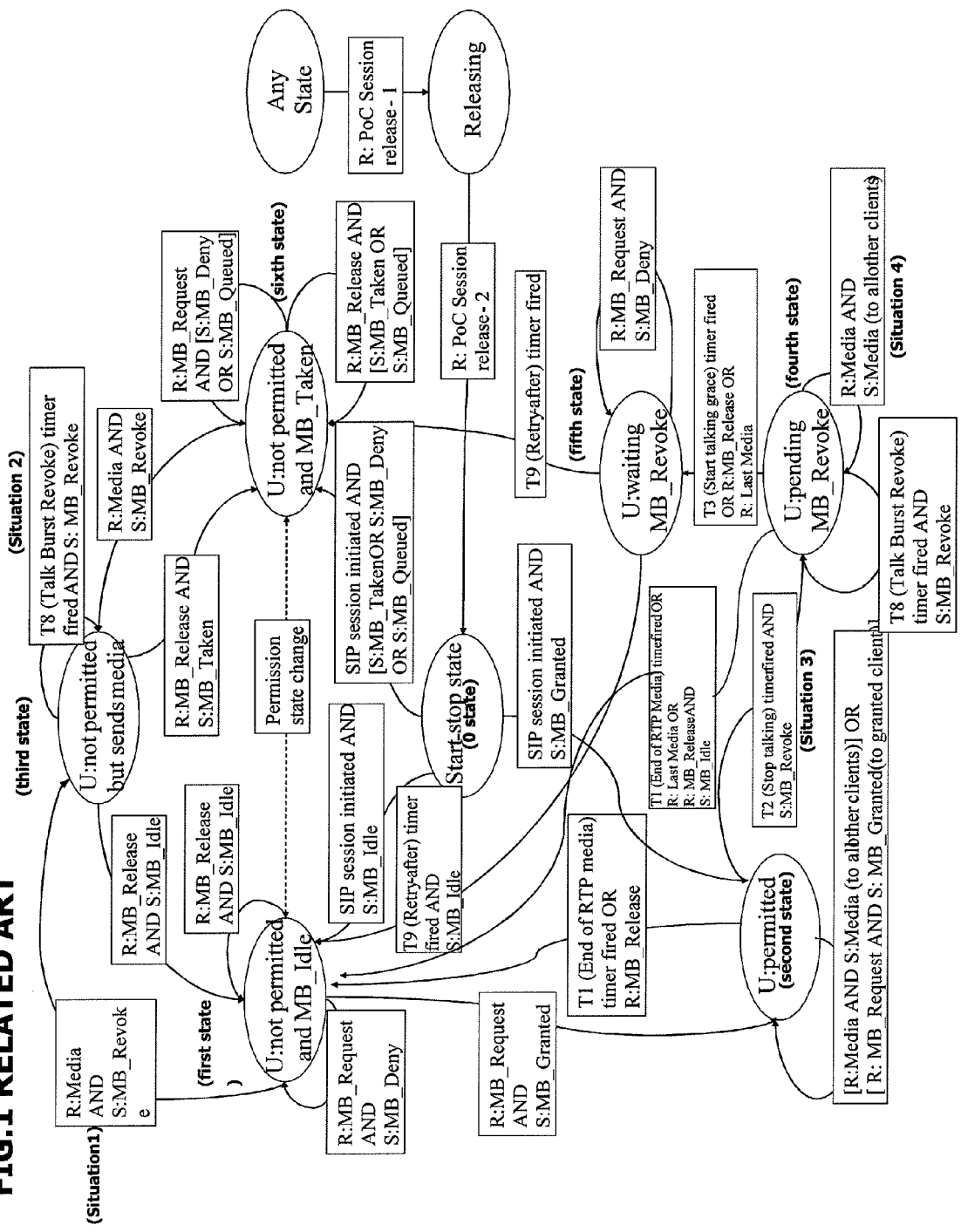
FIG. 1 is a state machine diagram illustrating a transmitting/receiving media burst between a PT client and a PT server according to a related art.
Figure 2:
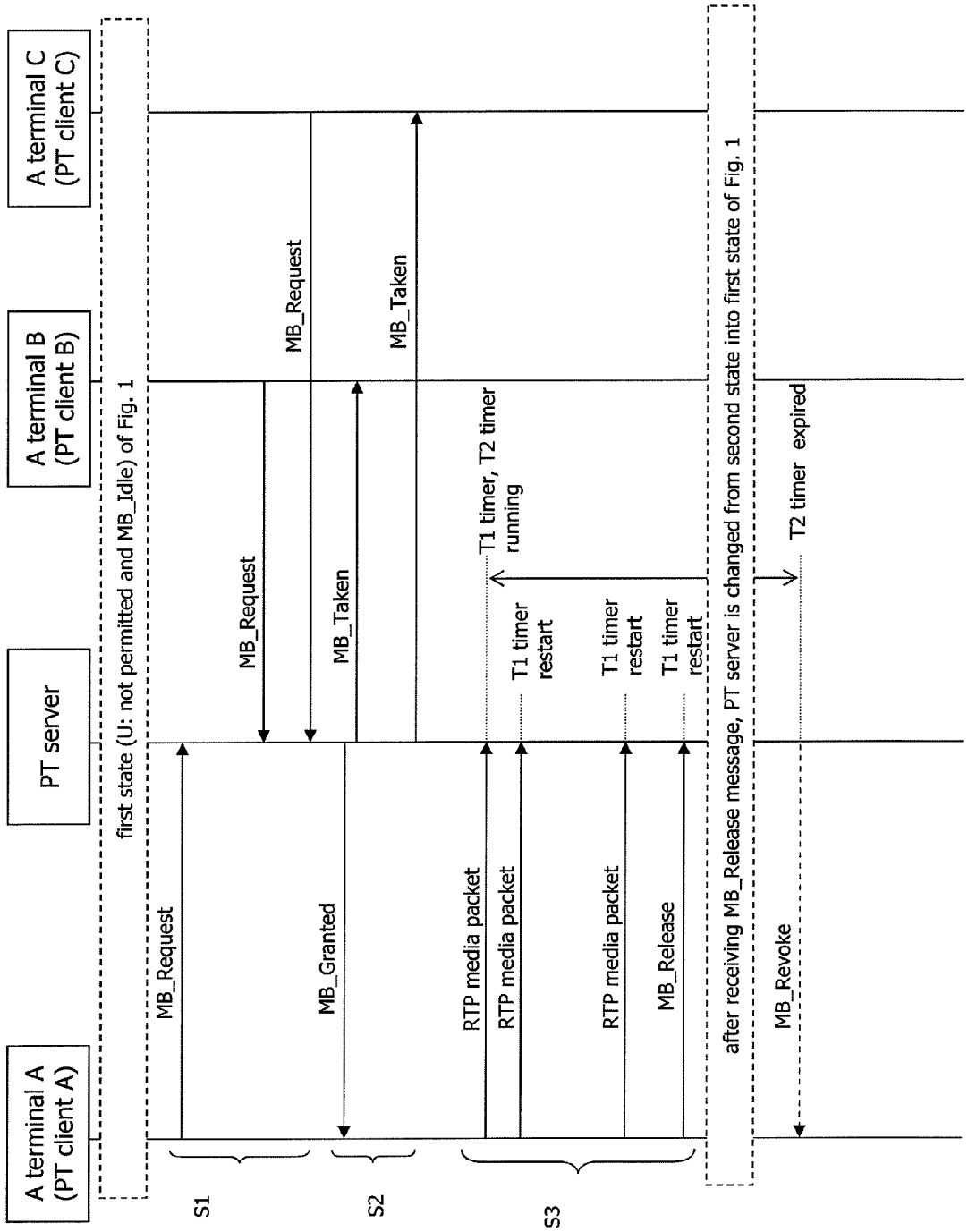
FIG. 2 is a signal flowchart illustrating acquisition of a permission to send a media burst and transmission of media data between a PT server and terminals (PT clients) according to a related art.

DESCRIPTION OF THE PREFERRED
EMBODIMENTS

This disclosure of the preferred embodiments of the present invention may be applied to PT communication systems providing PT services and related devices. However, this disclosure may not be limited to these, but be applicable to every wired/wireless communication system and related device to which technical characteristics of this disclosure can be applied.

According to one aspect of the present invention, when a terminal having a permission to send a media burst (floor or media burst authority) sends media data (e.g., RTP media packets having no sequence number) and a message for releasing the permission to send the media burst (i.e., MB_Release) to a PT server within a period of the permission to send the media burst, even if the PT server receives a part of the media data (e.g., the last RTP media packet or at least one RTP media packet which is not the last RTP packet) after receiving the MB_Release message due to a transit delay on different network routing paths, the terminal can be allowed to request the permission to send the media burst without any restraint by the PT server.

According to another aspect of the present invention, when the terminal having the permission to send the media burst sequentially sends media data (e.g., RTP media packets having sequence numbers) and the MB_Release message within the period of the permission to send a media burst, even if the PT server first receives the MB_Release message due to the transit delay on different network routing paths, and then receives a part of the media data (e.g., the last RTP media packet or at least one RTP media packet which is not the last RTP packet) until before the period of the permission to send the media burst elapses, the terminal can be allowed to request the permission to send the media burst without any restraint.

Hereinafter, constructions and operations of the preferred embodiments of the present invention will be explained with reference to the accompanying drawings. This disclosure may propose first and second embodiments for illustrated examples only.

The first embodiment applies to cases where RTP media packets (media data) have sequence numbers or where RTP media packets have no sequence numbers. The second embodiment preferably applies to a case where RTP media packets (media data) have sequence numbers, such that the PT server knows that one or more additional RTP media packets may be received by examining the 'sequence number of last packet' information included in a received media burst release message (e.g., MB_Release message) and thus can wait for any additional RTP media packet to be received. Here, the sequence number of each RTP media packet (media data) acts as an identifier of each packet, and also acts as a type of an indicator for informing a sequence (order) of each packet. Each MB_Release message includes information identifying a last RTP media packet such as 'sequence number of last packet'. However, each RTP media packet may or may not include its sequence number therein.

Figure 3:
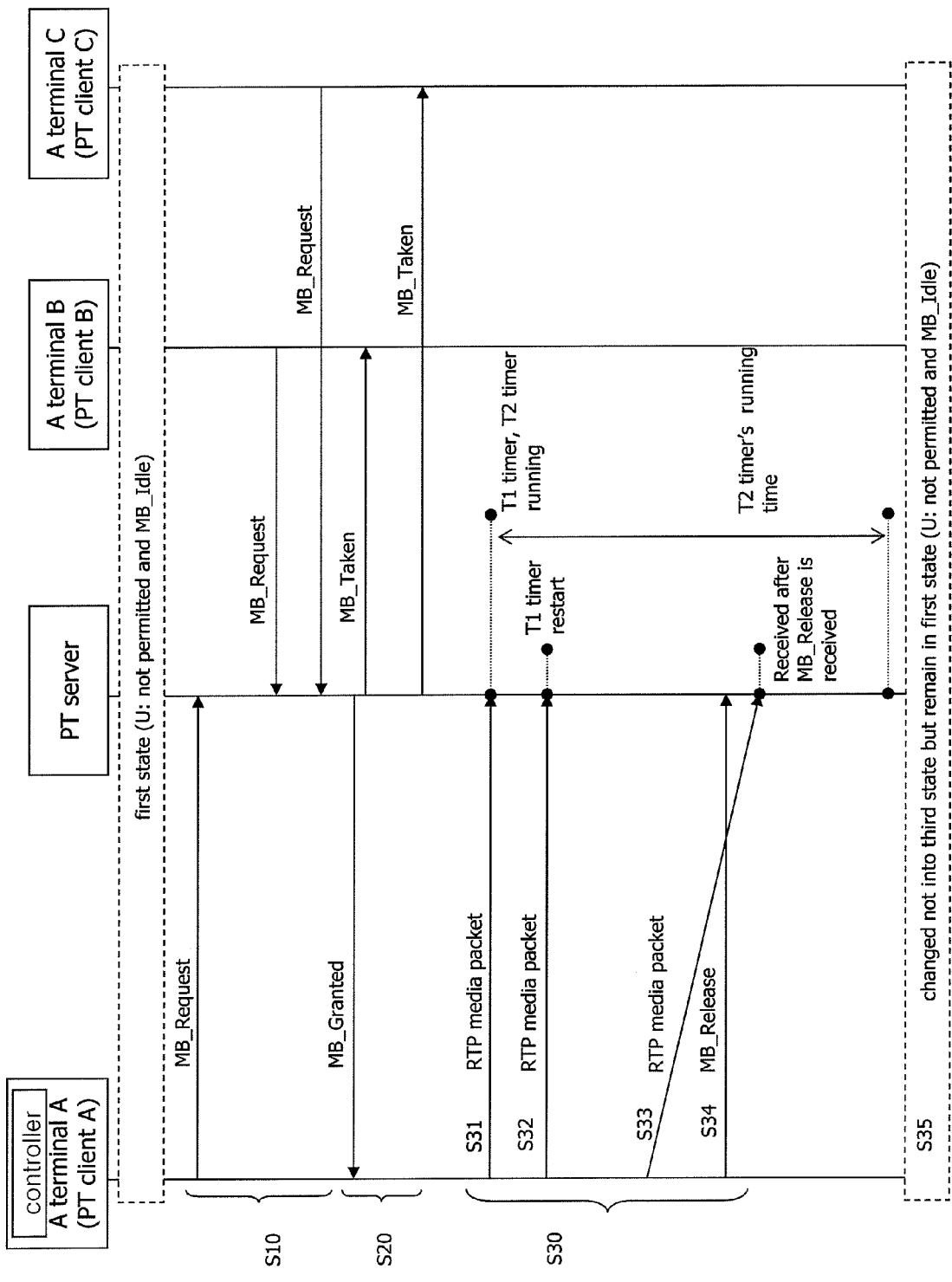
FIG. 3 is a signal flowchart illustrating a media burst control in accordance with a first embodiment of the present invention.

FIG. 3 is a signal flowchart illustrating a media burst control in accordance with the first embodiment of this disclosure.

Hereinafter, description is made with reference to FIGS. 1 and 3. Here, it is assumed that a SIP session is initiated in the zero state of the PT server in FIG. 1, and then the PT sever is in the first state by sending a MB_Idle message to each terminal. That is, each terminal is in a state in which they can request a media burst authority (floor or a permission to send media burst) to the PT server. However, description is given here on the assumption that a terminal A has been granted the permission to send a media burst from the PT server, only as an example.

Each of terminals A, B and C (PT client devices) sends a message for requesting a permission to send a media burst (e.g., MB_Request) to the PT server (S10). When the PT server has decided to grant a permission to send a media burst to the terminal A, it sends to the terminal A a granted message (e.g., MB_Granted) in response of the request for the permission to send a media burst by the terminal A, but sends to the terminals B and C a message for informing that the permission to send a media burst has been taken by the terminal A (S20). Through steps S10 and S20, a state of the PT server with respect to the terminal A is transited (changed or moved) from the first state of FIG. 1 into the second state machine (i.e., State 'U: permitted'). Therefore, the terminal A can send media data (or RTP media packets) to the PT server during a permitted time set on by a T2 timer. Also, through steps S10 and S20, the terminals B and C have received a MB-Taken message, and accordingly, the operation state of the PT server with respect to the terminals B and C corresponds to the six state (State 'U: not permitted and MB_Taken') of FIG. 1. Since the terminal A is in the second state (i.e., State 'U: permitted'). the terminal A can send media data (or RTP media packets) to the PT server (S30). Here, when receiving a first RTP media packet, the PT server operates both a T1 timer and a T2 timer. That is, the terminal A can send a series of RTP media packets to the PT server within a time (period) set on by the T2 timer (e.g., 30 seconds) (S31 to S33). Here, the PT server restarts the T1 timer whenever each RTP media packet is received. The T1 timer counts the period from the moment of receiving one RTP media packet to the moment of receiving the following RTP media packet.

When the T1 timer expires or a MB_Release message is received from the terminal A, the PT server determines that the terminal A has completely sent its media data, and then transits from the second state of FIG. 1 into the first state of FIG. 1, namely, into a state in which the terminal A can request a media burst authority (the permission to send a media burst).

Here, step S30 is explained in more detail. As illustrated in FIG. 3, the terminal A has sent to the PT server a series of RTP media packets within a period for which the terminal A is permitted to send the media data (i.e., a value (time period) set on by the T2 timer) (S31 to S33), and then has sent a MB_Release message (S34). Here, the messages (i.e., the RTP media packets and the MB_Release) sent by the terminal A can be sent to the PT server via different network routing paths, which can result in the occurrence of a transit delay due to the use of different network routing paths. Accordingly, the PT server can receive the last RTP media packet or one or more RTP media packets (which may not be the last RTP media packet) after receiving the MB_Release message sent by the terminal A (S34).

Since the PT server has received the MB_Release message at step S34 when the T2 timer is still running, a TBCP (or MBCP) state of the PT server with respect to the terminal A is transited from the second state (which is the current state) (i.e., a State 'U: permitted') to the first state machine (i.e., State 'U: not permitted and MB_Idle'). The PT server can receive a message for requesting the permission to send media burst (e.g., MB_Request) from the terminal A, which means the terminal A can send a media burst request to the PT server again if desired in this state.

Then, according to the present invention, as in step S33 if the PT server staying in the first state receives the last RTP media packet or any other RTP media packet(s), then the PT server determines if a MB_Release message (i.e. the message which the PT server has already received in the second state {i.e., State 'U: permitted}) has been already received. If it is determined the MB_Release message has been already received, then the PT server does not transit to the third state ('U: not permitted but sends media'), discards the received last or any other RTP media packet (without transmitting it to other PT client(s)), and remains in the first state, so the terminal A can request a permission to send a media burst again if desired. On the other hand, if it is determined the MB_Release message has not been received, then the PT server transits from the first state to the third state.

In the example of FIG. 3, the PT server in the first state determines that the MB_Release message (i.e. the message which the PT server has already received in the second state {i.e., State 'U: permitted}) has been received (e.g., at step S34) and thus discards the received RTP media packet(s), remains in the first state and does not transit to the third state (S35), contrary to the related art of FIG. 1. That is, when the PT server staying in the first state receives a RTP media packet of step S33, the state of the PT server with respect to the terminal A is not transited from the first state into the third state (i.e., State 'U: not permitted but sends media' of FIG. 1). As a result, even though the PT server has received the RTP media packet of step S33 after receiving the MB_Release message of step S34, the PT server may not decide that the terminal A who sent the media data has no permission to send the media burst.

In the above case, the PT server discards the last RTP media packet (or any other RTP media packet) received at step S33 after the receipt of the MB_Release message at step S34, and then allows the terminal A to still request the permission to send a media burst. That is, the TBCP (or MBCP) state of the PT server with respect to the terminal A is still staying at the first state. Therefore, it is possible to prevent the terminal A from being treated unfavorably due to the transit delay on the network routing paths, when the terminal A has first sent the media data (i.e., the series of RTP media packets) within a time (period) set on by the T2 timer, namely, within a period of the permission to send a media burst and then sent the MB_Release message. Accordingly, the state machine of the PT server with respect to the terminal is not be transited from the first state into the third state. Hence, according to the present invention, the terminal A can request a permission to send a media burst from the PT server again and is not penalized, which is advantageous and effective.

Figure 4:
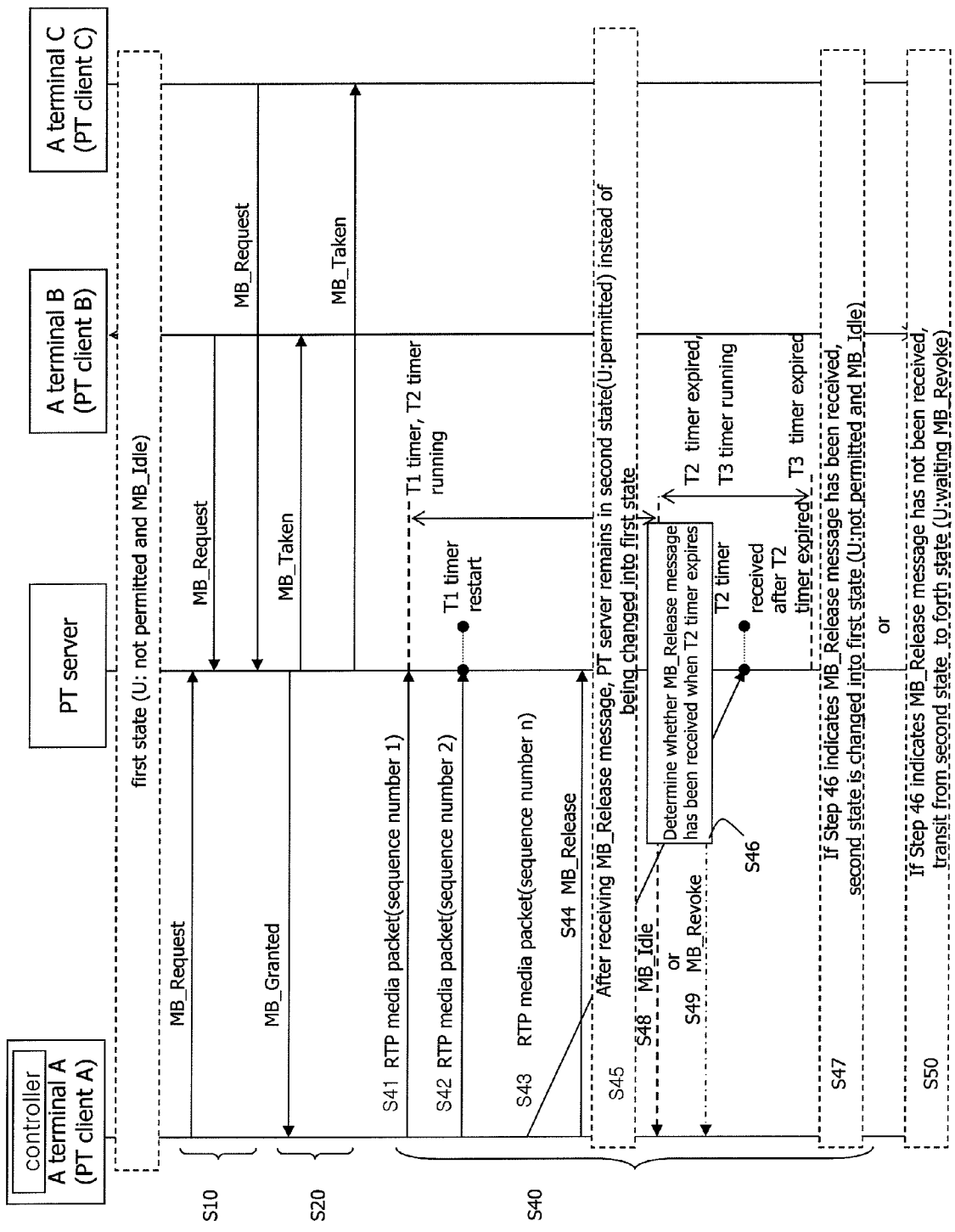
FIG. 4 is a signal flowchart illustrating a media burst control in accordance with a second embodiment of the present invention.

FIG. 4 is a signal flowchart illustrating a media burst control in accordance with a second embodiment of this disclosure. Here, it is assumed that a SIP session is initiated in the zero state of the PT server in FIG. 1, and then the PT sever is in the first state by sending a MB_Idle message to each terminal. That is, each terminal is in a state of being able to requesting a permission to send a media burst from the PT server. However, description is made on the assumption that the terminal A has been granted the permission to send a media burst by the PT server, only as an example. In the second embodiment of FIG. 4, operations and functions of steps (S10 and S20) are the same as steps S10 and S20 in the first embodiment of FIG. 3. In this example, however, unlike the first embodiment of FIG. 3, in the second embodiment of FIG. 4, each of RTP media packets (or media data) has a sequence number, and the MB_Release message includes information on a sequence number of the last RTP media packet.

In the second embodiment of the present invention as shown, e.g., in FIG. 4, even if the MB_Release message from the terminal A has been received by the PT server before receiving the last RTP media packet or at least one RTP media packet which may not be the last RTP media packet, which was sent earlier than the MB_Release message, the state of the PT server is not transited (changed) from the second state into the first state, but rather the second state of the PT server still stays with respect to the terminal A. This indicates that the PT server waits to receive the last RTP media packet (or any other RTP media packet(s)) from the terminal A until the T2 timer expires. In FIG. 4, each RTP media packet may have the sequence number so the PT server can wait for the last packet in view of the 'sequence number of last packet' information contained in the received MB_Release message.

Also, the second embodiment of FIG. 4 illustrates that, although the series of RTP media packets (preferably having sequence numbers) and the MB_Release message were sent to the PT server by the terminal A before the T2 timer expired, the MB_Release message may first be received by the PT server due to a transit delay on network routing paths. As a result, the T2 timer would expire in a state that the PT server has not received a part of the RTP media packets (e.g., the last or at least one RTP media packet). The operations associated with the receipt of the MB_Release message and any RTP media packet by the PT server will now be explained in more detail referring to step S40 according to the present invention.

Referring to step S40, the terminal A having the permission to send a media burst sends to the PT server a series of RTP media packets within a period for which the terminal A is permitted to send the media data (i.e., a value (time period) set on by the T2 timer) (S41 to S43). Here, preferably each of the RTP media packets has a sequence number. The terminal A then sends a MB_Release message to the PT server during the period for sending the media data (i.e., the value (time period) set by the T2 timer) (S44). However, even if the RTP media packets and the MB_Release message have sequentially been sent to the PT server by the terminal A, each RTP media packet and the MB_Release message may be sent via different network routing path. Accordingly, a transit delay may occur due to the different routing paths through which the packets and the message have been sent.

In the example of FIG. 4, before the T2 timer expires, the PT server receives a RTP media packet (sequence number 1), a RTP media packet (sequence number 2), and so on (S41 and S42). Afterwards, the PT server may first receive a MB_Release message before receiving the last or any other RTP media packet (e.g., a RTP media packet with a sequence number n) due to the transit delay (S43 and S44). Here, the PT server can determine if the received RTP media packet is the last RTP media packet by analyzing information on the sequence number (e.g., n) of the last RTP media packet included in the received MB_Release message. For instance, the 'sequence number of last packet' information/parameter provided in the received MB_Release message may be examined. The PT server can then store the information on the sequence number of the last RTP media packet in a specific memory (e.g., a memory built in (equipped with) the PT server or an external memory).

Since the 'sequence number of last packet' information included in the received MB_Release indicates that the PT server still needs to receive the last packet, the PT server waits to receive the last RTP media packet (with the sequence number n) of step S43 when the PT server receives the MB_Release message. And, the state of the PT server with respect to the terminal A is not transited from the second state to the first state, but rather the PT server remains in the second state at this time (S45) according to the present invention. As a result the PT server can receive media data (e.g., the last RTP media packet with the sequence number n) sent by the terminal A before the T2 timer expires.

If, however, the last RTP media packet (with the sequence number n) is not received when the T2 timer expires (e.g., in step S43, the last RTP media packet is received after the T2 timer expires), then the PT server determines whether or not it has already received the MB_Release message (S46). That is, when the T2 timer expires while the PT server is in the second state ('U: permitted'), the PT server does not transit to the fourth state, but remains in the second state (S45), and then determines if the MB_Release message has been already received by the PT server (S46). If it is determined that the MB_Release message has been already received, then the PT server transits from the second state to the first state ('U: not permitted and MB_Idle'), transmits a MB_Idle message to the terminal A, and discards any RTP media packet received thereafter. In the example of FIG. 4, since the PT server already has received the MB_Release message at step S44, the PT server at step S45 determines that the MB_Release message has been already received, then transits from the second state to the first state, and then transmits a MB_Idle message to the terminal A while remaining in the first state (S47 and S48).

On the other hand, if the PT server at step S45 determines that the MB_Release has not been received, then the PT server sends a MB_Revoke message to the terminal A (S49) and transits from the second state to the fourth state ('U: pending MB_Revoke') (S50).

As discussed above, according to the determination at step S45, the PT server can know it has already received the MB_Release message at step S44 before the T2 timer expires. Therefore, the PT server is transited from the second state into the first state such that the terminal A can request a permission to send a media burst, which is advantageous. That is, the PT server does not send the MB_Revoke message to the terminal A as soon as the T2 timer expires according to the present invention. In addition, the state of the PT server with respect to the terminal A is not transited (changed) from the second state into the fourth state (i.e., State 'U: pending MB Revoke') in this case. However, if it is determined at step S45 that the PT server has not yet received the MB_Release message at the time point when the T2 timer expires, the PT server sends the MB_Revoke message to the terminal A (S49). Here, the state of the PT server with respect to the terminal A is transited from the second state into the fourth state (i.e., State 'U: pending MB_Revoke')(S50).

In the meantime, the PT server can operate the T3 timer when the T2 timer expires. If the PT server receives the last RTP media packet (with the sequence number n) before the T3 timer expires, the PT server sends the last RTP media packet (with the sequence number n) to the terminal B and/or the terminal C (i.e., corresponding to Situation 4 of FIG. 1). However, when the T3 timer expires or the PT server staying in the fourth state receives the last RTP media packet (with the sequence number n), the PT server shall consider that the terminal A has sent the media data (i.e., the last RTP media packet with the sequence number n) without the media burst authority (the permission to send a media burst). Accordingly, the state of the PT server with respect to the terminal A shall be transited (changed) from the fourth state (i.e., state 'U: pending MB_Revoke') into the fifth state (i.e., state 'U: waiting MB_Revoke'). Under the fifth state, the PT server penalizes the terminal A not to request the permission to send a media burst for a certain period (i.e., for a period set on by the T9 timer).

Therefore, in the second embodiment of the present invention, if the PT server has received the MB_Release message before receiving the last RTP media packet from the terminal A within the permitted period of the T2 timer, the PT server checks (analyzes) the information related to the sequence number of the last RTP media packet included in the MB_Release message, and then waits to receive the last RTP media packet by not transiting from the second state to the first state. However, even if the PT server has not received the last RTP media packet at the time when the T2 timer expires, the PT server does not automatically send the MB_Revoke message to the terminal A but determines if the MB_Release message has been received and may move from the second state to the fourth state based on this determination. In the related art, the PT server transits automatically from the second state to the fourth state when the T2 timer expires, which causes the timers T3 and T9 to run, during which time of T9 the terminal cannot request a permission to send a media burst. This is a problem because it penalizes the terminal too severely. The present invention address this limitation because the PT server selectively transits from the second state to the fourth state based on the result of the determination step S46. As a result, according to the present invention, the user (Terminal A) is not penalized unnecessary and the PT server can allow the terminal A to request a permission to send a media burst. Therefore, the terminal A can desirably be provided with the PT service without any restriction due to the network transit delay.

As described above, this disclosure of the present invention has been explained with reference to the embodiments which are merely exemplary. It will be apparent to those skilled in the art that various modifications and variations can be made in this disclosure. For example, the methods of the present invention discussed herein can be implemented by software, hardware, or a combination thereof, namely, it can be stored in a storage medium (e.g., an inner memory of a terminal, a flash memory, hard disc, etc.), and also be implemented as codes or command words within a software program which can be performed by a processor (e.g., an inner microprocessor of the terminal). Also, in the embodiments of the present invention, a talk burst indicates audio data and a media burst indicates data such as characters, moving images, or photos. The talk burst and the media burst can all be applied to the embodiments of this disclosure regardless of data formats. Thus, it is intended that this disclosure cover modifications and variations of this invention provided they come within the scope of the appended claims and their equivalents.

Each terminal (e.g., terminal A, B, C, etc.) according to the present invention is a PT client device (any device having a PT client) capable of providing a PT service. Each terminal can include a controller, a memory, and any other component(s) for implementing the methods of the present invention discussed herein. For instance, each terminal may be one of all types of mobile communications terminals, PT service available notebooks, desktop computers, portable game devices, MPS, or other home appliances. Also, in the description of the present invention, each terminal preferably denotes a physical entity including a PT client, and the PT client preferably denotes a logical or physical entity included in the terminal. Accordingly, for the sake of the explanation of the present invention, the terminal may be referred to as a PT client device or vice-versa.

Figure 5:
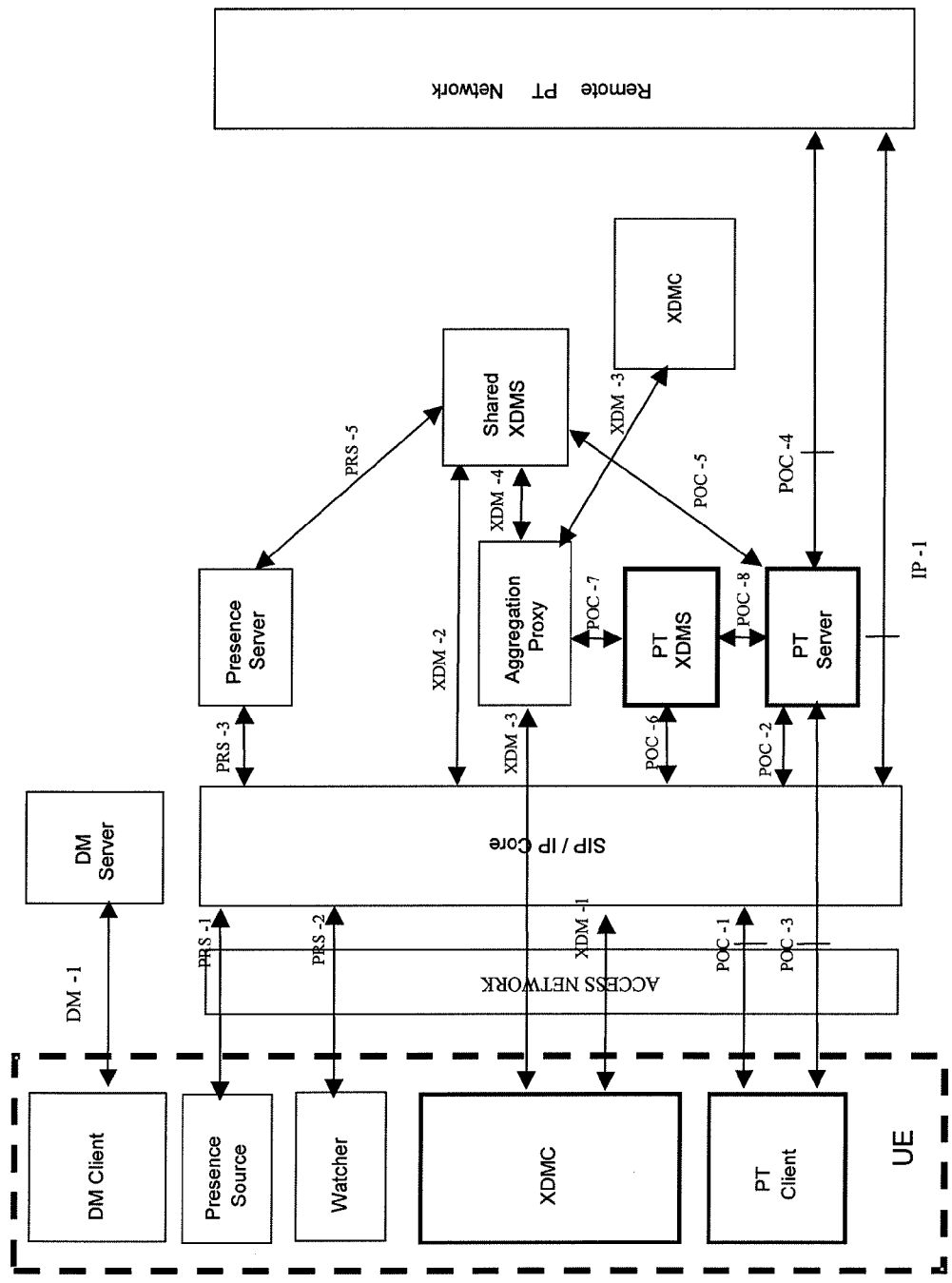
FIG. 5 is a PT architecture illustrating a UE (or terminal) of the present invention.

FIG. 5 is a PT (Push To) system architecture including configuration of a terminal (or UE) in accordance with the present invention. Hereinafter, description will be made with reference to the FIG. 5.

In the example of FIG. 5, the PT client may reside on the mobile terminal and is used to access the PT service. The PT client may be configured to allow PT session initiation, (e.g., codec negotiation), participation (e.g., talk or listen) and release. The PT client may be configured to perform registration with a SIP/IP Core and authenticate a PT user to a SIP/IP Core. The PT client may be configured to generate and send Talk Bursts (Media Bursts) by recording and encoding audio. The PT client may be configured to receive Talk Bursts and generate audio by decoding the received Talk Bursts. The PT client may be configured to support Talk Burst Control procedures and Talk Burst Control Protocol negotiation. The PT client may be configured to incorporate PT configuration data provided by the DM client. The PT client may be configured to support the capability to set the Answer Mode Indication (Manual Answer, Automatic Answer), the Incoming PT Session Barring and Incoming Instant Personal Alert Barring and Simultaneous PT Sessions Support. The PT client may be configured to Support User Plane adaptation procedures if initiated by the PT server. The PT client may be configured to support receiving of Instant Personal Alert. The PT client may be configured to support sending of Instant Personal Alert and provide Group Advertisement. The PT client may be configured to support multiple Talk Burst Control Protocols and Talk Burst request queuing that may be based on priority or timestamp. The PT client may be configured to send quality feedback reports after end of Talk Burst. The PT client may be configured to support for Pre-established Sessions. The PT client may be configured to support Simultaneous Sessions and Session on-hold procedures, to request privacy for User identity.

In the example of FIG. 5, XDMC (XML Document Management Client) may be an XCAP client which manages XML documents stored in the network (e.g., PT-specific documents in the PT XDMS, URI lists used as for example, Contact Lists in the Shared XDMS, etc.). Management features include operations such as create, modify, retrieve and delete.

In the example of FIG. 5, the Presence Source is an entity that provides (publishes) presence information to a Presence service. The Watcher is an entity that requests presence information about a Presentity, or Watcher Information about a Watcher, form the Presence service.

As discussed above, in this disclosure, the terminal can request a permission to send a media burst (talk burst authority or media burst authority or floor) without any restraint of the PT server due to the network transit delay. Therefore, the terminal and the PT server can use the PT service smoothly and desirably.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for controlling a state of a Push-To (PT) server, the method comprising:
   starting, by a PT server, a stop talking (T2) timer which is a type of media burst control timer that operates with respect to a terminal having permission to send a media burst;
   checking, by the PT server on expiry of the T2 timer, whether a media burst release message was already received while the T2 timer was running; and
   entering, by the PT server, a media burst idle state if the media burst release message was already received as a result of the checking step.

2. The method of claim 1, before performing the starting step, further comprising:
   receiving a talk burst request message from the terminal; and
   sending a talk burst grant message to the terminal in response to the received talk burst request message.

3. The method of claim 2, wherein the PT server enters a "U: permitted" state after sending the talk burst grant to the terminal, wherein the "U: permitted" state is a stable state and the PT server uses this state when a PT client of the terminal has been given permission to send the media burst.

4. The method of claim 1, wherein the media burst idle state is a "U: not permitted and MB_Idle" state that is a stable state in which the PT server can receive the media burst request from a PT client of the terminal.

5. A method for a Push-To (PT) client device, the method comprising:
   sending, to a PT server, a media burst request message;
   receiving, from the PT server, a media burst grant message in response to the sent media burst request message;
   sending, to the PT server, a media burst release message when releasing a permission to send a media burst; and
   receiving, from the PT server, a media burst idle message if the PT server had received the media burst release message before expiry of a stop talking (T2) timer that the PT server operates and the PT server entered a media burst idle state as a result of already having received the media burst release message.

6. The method of claim 5, wherein a media burst revoke message is not received from the PT server due to the PT server having received the media burst release message before expiry of the T2 timer.

7. A method for a Push-To (PT) client device, the method comprising:
   sending, to a PT server, a media burst request message;
   receiving, from the PT server, a media burst grant message in response to the sent media burst request message;
   sending, to the PT server, a media burst release message when releasing a permission to send a media burst; and
   receiving, from the PT server, a media burst idle message if the PT server had received the media burst release message in a "U: permitted" state such that the PT server entered a media burst idle state.

8. The method of claim 7, wherein the "U: permitted" state is a stable state and the PT server uses this state when a PT client of the terminal has been given permission to send the media burst.

9. The method of claim 7, wherein the media burst idle state is a "U: not permitted and MB_Idle" state that is a stable state in which the PT server can receive the media burst request from a PT client of the terminal.

* * * * *